US011631331B1

(12) United States Patent
Palmer

(10) Patent No.: US 11,631,331 B1
(45) Date of Patent: Apr. 18, 2023

(54) SYSTEMS AND METHODS FOR PROVIDING LANE-SPECIFIC RECOMMENDATIONS TO A VEHICLE OPERATOR OF A VEHICLE

(71) Applicant: SmartDrive Systems, Inc., San Diego, CA (US)

(72) Inventor: Jason Palmer, San Diego, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 322 days.

(21) Appl. No.: 16/430,262

(22) Filed: Jun. 3, 2019

(51) Int. Cl.
*B60W 30/18* (2012.01)
*G01C 21/36* (2006.01)
(Continued)

(52) U.S. Cl.
CPC ....... *G08G 1/167* (2013.01); *B60W 30/18163* (2013.01); *G01C 21/3658* (2013.01);
(Continued)

(58) Field of Classification Search
CPC ..... B60W 2554/801; B60W 2554/804; B60W 30/18163; B60W 10/20; B60W 30/12; B60W 2540/20; B60W 2555/60; B60W 2556/50; B60W 30/00; B60W 30/0953; B60W 30/0956; B60W 30/14; B60W 30/162; B60W 30/18109; B60W 30/18145; B60W 30/18154; B60W 40/04; B60W 50/14; B60W 50/16; B60W 2050/0013;
(Continued)

(56) References Cited

U.S. PATENT DOCUMENTS

2010/0036578 A1* 2/2010 Taguchi ............. B60K 31/0008
701/93
2015/0285646 A1* 10/2015 Bruemmer ............. B25J 9/1694
701/522
(Continued)

FOREIGN PATENT DOCUMENTS

DE   102016212149 A1 *  1/2018  ............. G08G 1/167

OTHER PUBLICATIONS

Why UPS Drivers Don't Turn Left and You Probably Shouldn't Either "https://www.ge.com/news/reports/ups-drivers-dont-turn-left-probably-shouldnt-either#:~:text=The%20company%20gives%20each%20driver,than%20they%20have%20to%20be." (Year: 2017).*

*Primary Examiner* — Abby Y Lin
*Assistant Examiner* — Hossam M Abd El Latif
(74) *Attorney, Agent, or Firm* — Esplin & Associates, PC

(57) ABSTRACT

Systems and methods for providing lane-specific recommendations to a vehicle operator of a vehicle operating on roadways are disclosed. The roadways include one or more lanes in each direction of travel. Exemplary implementations may: generate, by a set of sensors, output signals conveying information pertaining to the vehicle; determine a current location of the vehicle; determine a current direction of travel of the vehicle; detect a current lane being used by the vehicle from the multiple traffic lanes of the particular roadway at the current location in the current direction of travel; obtain lane-specific information regarding the multiple traffic lanes at or near the current location of the vehicle; obtain a goal for providing lane-specific recommendations; determine a lane-specific recommendation for the vehicle; and provide the lane-specific recommendation to the vehicle operator.

20 Claims, 4 Drawing Sheets

(51) Int. Cl.
*G06V 20/56* (2022.01)
*G08G 1/16* (2006.01)

(52) U.S. Cl.
CPC ..... *G06V 20/588* (2022.01); *B60W 2554/801* (2020.02); *B60W 2554/804* (2020.02)

(58) Field of Classification Search
CPC ..... B60W 2552/53; B60W 2554/4046; B60W 2710/20; B60W 40/072; B60W 60/00276; G08G 1/167; G08G 9/00798; G08G 21/3658; G08G 1/09623; G08G 1/166
USPC ........................................................ 701/301
See application file for complete search history.

(56) References Cited

U.S. PATENT DOCUMENTS

| | | | | |
|---|---|---|---|---|
| 2017/0082452 | A1* | 3/2017 | Sumizawa | G08G 1/0141 |
| 2017/0227966 | A1* | 8/2017 | Monzen | B62D 15/0255 |
| 2018/0099676 | A1* | 4/2018 | Goto | B62D 15/0255 |
| 2020/0363223 | A1* | 11/2020 | Abrams | G06F 30/20 |
| 2021/0182997 | A1* | 6/2021 | Klingemann | G01C 21/3469 |

* cited by examiner

US 11,631,331 B1

SYSTEMS AND METHODS FOR PROVIDING LANE-SPECIFIC RECOMMENDATIONS TO A VEHICLE OPERATOR OF A VEHICLE

FIELD OF THE DISCLOSURE

The present disclosure relates to systems and methods for providing lane-specific recommendations to a vehicle operator of a vehicle operating on roadways, the roadways including one or more traffic lanes in each direction of travel.

BACKGROUND

Route guidance from a current location to a target destination is known. Monitoring vehicle operations is known, in particular for the occurrence of events such as collisions. Video monitoring of vehicles or vehicle operators during operation is known.

SUMMARY

One aspect of the present disclosure relates to a system configured for providing lane-specific recommendations to a vehicle operator of a vehicle operating on roadways. The roadways may include one or more traffic lanes in each direction of travel. The system may include one or more hardware processors configured by machine-readable instructions. The system may be configured to generate, by a set of sensors, output signals conveying information pertaining to the vehicle. The processor(s) may be configured to determine a current location of the vehicle. The determination of the current location may be based on the generated output signals. The current location may correspond to a particular roadway. The particular roadway may include one or more lanes in each direction of travel. The processor(s) may be configured to determine a current direction of travel of the vehicle. The determination of the current direction of travel may be based on the generated output signals. The current direction of travel may correspond to the particular roadway. The current direction of travel may be associated with multiple traffic lanes. The processor(s) may be configured to detect a current lane being used by the vehicle from the multiple traffic lanes of the particular roadway at the current location in the current direction of travel. The detection of the current lane may be based on the generated output signals. The processor(s) may be configured to obtain lane-specific information regarding the multiple traffic lanes at or near the current location of the vehicle. The multiple traffic lanes may include the current lane. The lane-specific information may be based on previously detected vehicle usage on the roadways. The processor(s) may be configured to obtain a goal for providing lane-specific recommendations. The processor(s) may be configured to determine a lane-specific recommendation for the vehicle. The determination of the lane-specific recommendation may be based on the obtained lane-specific information and the obtained goal. The processor(s) may be configured to provide the lane-specific recommendation to the vehicle operator.

Another aspect of the present disclosure relates to a method for providing lane-specific recommendations to a vehicle operator of a vehicle operating on roadways. The roadways may include one or more traffic lanes in each direction of travel. The method may include generating, by a set of sensors, output signals conveying information pertaining to the vehicle. The method may include determining a current location of the vehicle. The determination of the current location may be based on the generated output signals. The current location may correspond to a particular roadway. The particular roadway may include one or more lanes in each direction of travel. The method may include determining a current direction of travel of the vehicle. The determination of the current direction of travel may be based on the generated output signals. The current direction of travel may correspond to the particular roadway. The current direction of travel may be associated with multiple traffic lanes. The method may include detecting a current lane being used by the vehicle from the multiple traffic lanes of the particular roadway at the current location in the current direction of travel. The detection of the current lane may be based on the generated output signals. The method may include obtaining lane-specific information regarding the multiple traffic lanes at or near the current location of the vehicle. The multiple traffic lanes may include the current lane. The lane-specific information may be based on previously detected vehicle usage on the roadways. The method may include obtaining a goal for providing lane-specific recommendations. The method may include determining a lane-specific recommendation for the vehicle. The determination of the lane-specific recommendation may be based on the obtained lane-specific information and the obtained goal. The method may include providing the lane-specific recommendation to the vehicle operator.

As used herein, any association (or relation, or reflection, or indication, or correspondency) involving servers, processors, client computing platforms, vehicles, vehicle operators, roadways, lanes, sensors, locations, directions, determinations, detections, goals, recommendations, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
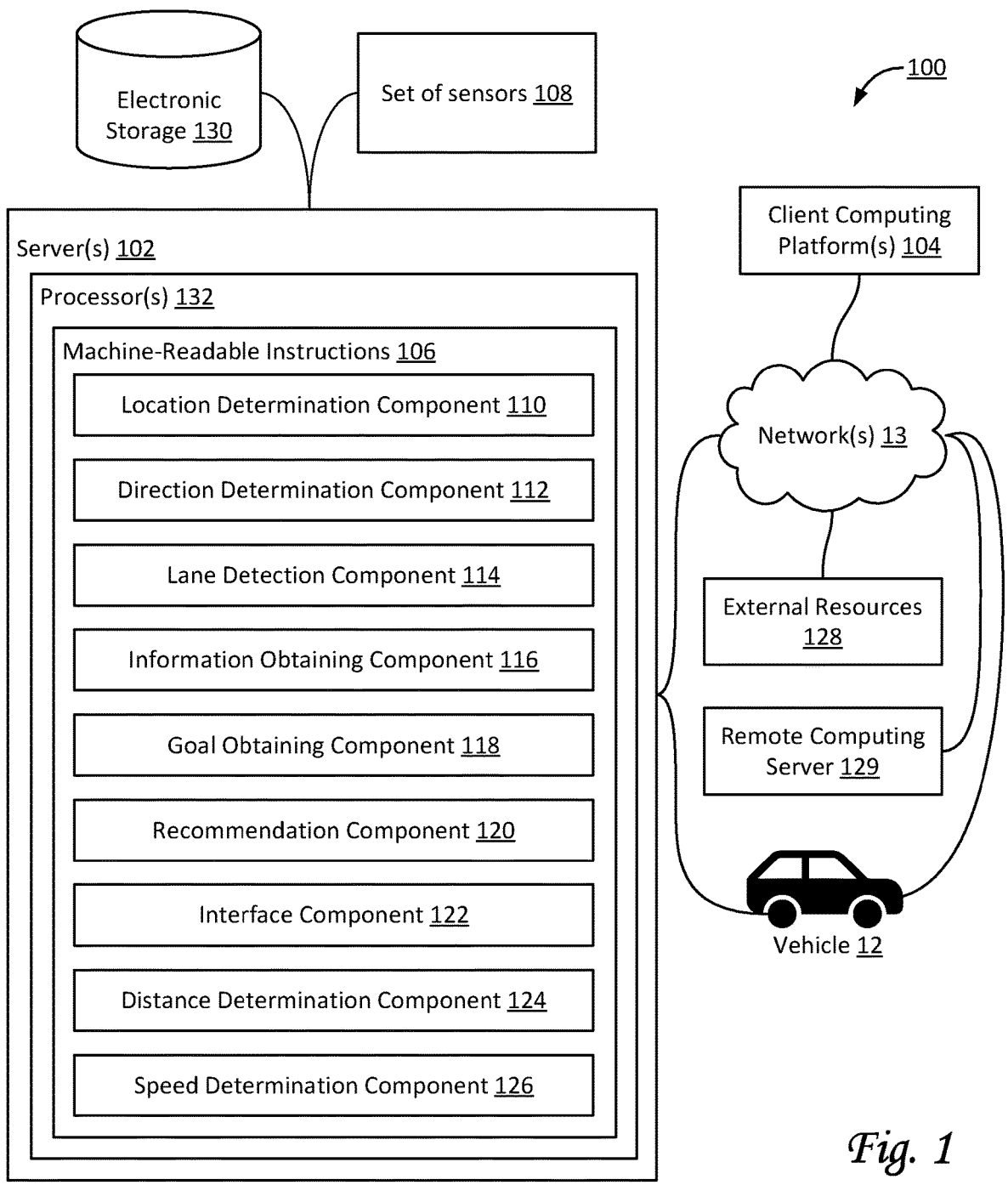
FIG. 1 illustrates a system configured for providing lane-specific recommendations to a vehicle operator of a vehicle, in accordance with one or more implementations.

FIG. 1 illustrates a system 100 configured for providing lane-specific recommendations, advice, and/or preferences to vehicle operators of vehicles operating on roadways, in accordance with one or more implementations. The roadways may include one or more traffic lanes in each direction of travel. The lane-specific recommendations may include advice on and/or preferences regarding particular traffic lanes to use or avoid. Recommendations may be provided for a variety of reasons, including but not limited to fuel-efficiency, minimal travel duration, minimal likelihood of vehicle events, and/or minimal operating complexity for the vehicle operator. In some implementations, system 100 may include one or more of servers 102, electronic storage 130, a set of sensors 108, network(s) 13, client computing platform(s) 104, external resources 128, a remote computing server 129, and/or other components. System 100 and/or components thereof may be carried and/or otherwise supported by one or more vehicles (e.g., a first vehicle, a second vehicle, a third vehicle, and so forth), including but not limited to a vehicle 12. Operation of system 100 may be described in the context of a particular vehicle, e.g., vehicle 12, but this is not intended to be limiting. In some implementations, system 100 may provide lane-specific recommendations for a fleet of multiple vehicles. In some implementations, individual vehicles (e.g., vehicle 12) may carry and/or otherwise support system 100 and/or components thereof. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Individual vehicles may include a set of resources for data processing and/or electronic storage, including but not limited to persistent storage. Individual vehicles may include sensors (e.g., set of sensors 108). In some implementations, individual vehicles may be configured to detect vehicle events, e.g., based on output signals generated by one or more sensors. As used herein, the term "vehicle event" may include occurrences of events involving one or more vehicles, the events being pertinent to lane-specific recommendations. As such, vehicle events include information gathered by monitoring the operation of one or more vehicles, including but not limited to information related to average speed in a particular traffic lane, average following distance in a particular traffic lane, and/or other information related to a particular traffic lane. In some implementations, operation of vehicle 12 may be actively and primarily controlled by a vehicle operator (i.e., a human operator). In some implementations, operation of vehicle 12 may be actively and primarily controlled by an autonomous driving algorithm (also referred to as an algorithmic vehicle operator, or a non-human vehicle operator). In such a case, a human vehicle operator may take over (or be requested to take over) control of the autonomous driving algorithm, e.g., responsive to extreme and/or unconventional driving scenarios, or responsive to a failure or error-condition of the autonomous driving algorithm. In some implementations, a human vehicle operator and an autonomous driving algorithm may form a team that controls operations of vehicle 12 together.

Set of sensors 108 may be configured to generate output signals conveying information related to (operation of) vehicle 12, a vehicle operator of vehicle 12, and/or a context of vehicle 12 (e.g., related to the surroundings of vehicle 12). In some implementations, set of sensors 108 may be carried by vehicle 12. In some implementations, one or more sensors in set of sensors 108 may be external to vehicle 12, such as roadside sensors, sensors embedded in the surface of a roadway, sensors carried by other vehicles, and/or other sensors. Although set of sensors 108 is depicted in FIG. 1 as a single element, this is not intended to be limiting. In some implementations, set of sensors 108 may be configured to generate output signals continuously, in an on-going manner, and/or at regular or irregular intervals during operation of vehicle 12.

Information related to the operation of vehicle 12 may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 14 may be a vehicle system sensor included in an Engine Control Module (ECM) system of vehicle 12.

In some implementations, set of sensors 108 may generate output signals conveying information related to a vehicle operator of vehicle 12, such as visual information, motion-related information, position-related information, biometric information, medical information, and/or other information. In some implementations, set of sensors 108 may include one or more sensors configured to generate output signals that convey information related to biological activity of the vehicle operator. In some implementations, one or more sensors may be wearable by the vehicle operator. In some implementations, one or more sensors may be placed in physical proximity to the vehicle operator to facilitate monitoring the biological activity of the vehicle operator. The information related to the biological activity of the vehicle operator may include heart rate, respiration rate, verbal expressions, responses to conditions in the physical environment in and/or around vehicle 12, and/or other characteristics of or information about the vehicle operator.

In some implementations, set of sensors 108 may generate output signals conveying information related to the context of vehicle 12, such as information related to the environment in and/or around vehicle 12. The vehicle environment may include spaces in and around an interior and an exterior of vehicle 12. The information related to the context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying the information related to the context of vehicle 12 may be generated via non-standard aftermarket sensors installed in vehicle 12. Set of sensors 108 may include, for example, one or more of an image sensor, a camera, a video camera, a microphone, an accelerometer, a gyroscope, a geolocation sensor (e.g., a Global Positioning System or GPS device), a radar detector, a magnetometer, lidar (e.g., for measuring distance of a leading vehicle), an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an inertial measurement sensor, a tilt sensor, a motion sensor, a vibration sensor, an ultrasonic sensor, an infrared sensor, a light sensor, a depth sensor, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files.

As used herein, the terms "camera" and/or "image sensor" may include any device that captures image information, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, distance information, and/or other information. Information captured by one or more sensors may be marked, timestamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. In some implementations, set of sensors 108 may include multiple cameras positioned around the vehicle and synchronized together to provide a 360-degree view of the inside of a vehicle and/or a 360-degree view of the outside of a vehicle. In some implementations, an image sensor may be integrated with electronic storage such that captured information may be (processed and) stored in the integrated embedded storage. In some implementations, a sensor may be configured to transfer captured information to remote electronic storage media, e.g. through "the cloud."

Server(s) 102 may be configured by machine-readable instructions 106. Machine-readable instructions 106 may include one or more instruction components. The instruction components may include computer program components. The instruction components may include one or more of location determination component 110, direction determination component 112, lane detection component 114, information obtaining component 116, goal obtaining component 118, recommendation component 120, interface component 122, distance determination component 124, speed determination component 126, and/or other instruction components.

Figure 3:
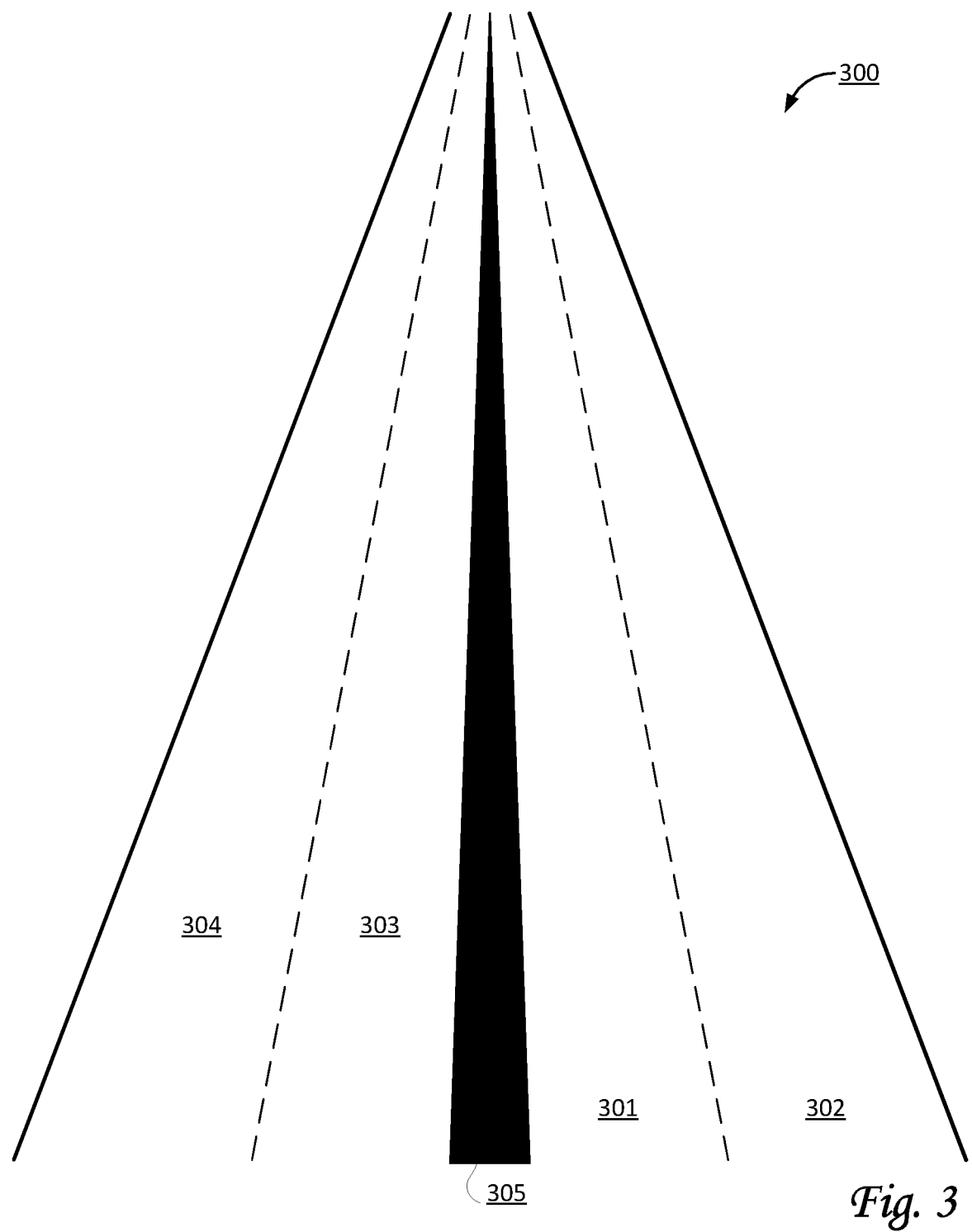
FIGS. 3 and 4 illustrate exemplary roadways as may be used by a system configured for providing lane-specific recommendations to a vehicle operator of a vehicle, in accordance with one or more implementations.

Location determination component 110 may be configured to determine locations of vehicles. For example, location determination component 110 may be configured to determine a current location of vehicle 12. The determination of the current location may be based on output signals generated by set of sensors 108. For example, the current location of vehicle 12 may be determined based on output signals from one or more geolocation sensors. The current location may correspond to a particular roadway. The particular roadway may include one or more lanes in each direction of travel. By way of non-limiting example, FIG. 3 illustrates an exemplary roadway 300 as may be used by a system such as system 100 (depicted in FIG. 1). As depicted in FIG. 3, roadway 300 may include a left lane 301 and a right lane 302 heading in the same direction and divided by a divider 305 from two traffic lanes heading in the opposite direction, an inner traffic lane 303 and an outer traffic lane 304.

Referring to FIG. 1, direction determination component 112 may be configured to determine directions of travel of vehicles. For example, direction determination component 112 may be configured to determine a current direction of travel of vehicle 12. The determination of the current direction of travel may be based on output signals generated by set of sensors 108. The current direction of travel may correspond to a particular roadway, such as the particular roadway that corresponds to the current location of vehicle 12 (e.g., as determined by location determination component 110). The current direction of travel as determined by direction determination component 112 may be associated with multiple traffic lanes.

Lane detection component 114 may be configured to detect particular traffic lanes. For example, lane detection component 114 may be configured to detect a current lane being used by vehicle 12 from multiple traffic lanes. In some implementations, the multiple traffic lanes may be associated with the particular roadway at the current location of vehicle 12 (e.g., as determined by location determination component 110) in the current direction of travel of vehicle 12 (e.g., as determined by direction determination component 112). For example, lane detection component 114 may be configured to detect a current lane being used by vehicle 12 from the multiple traffic lanes of the particular roadway at the current location in the current direction of travel of vehicle 12. Detection of the current lane by lane detection component 114 may be based on output signals generated by set of sensors 108. For example, in some implementations, detection of the current lane (e.g., whether it is the left lane, middle lane, or right lane, and so forth) may be based on information captured by an image sensor. In some implementations, system 100 may be configured to provide lane-specific recommendations, advice, and/or preferences for a particular vehicle without knowing, using, and/or requiring knowledge of the current lane being used by the particular vehicle.

Figure 4:
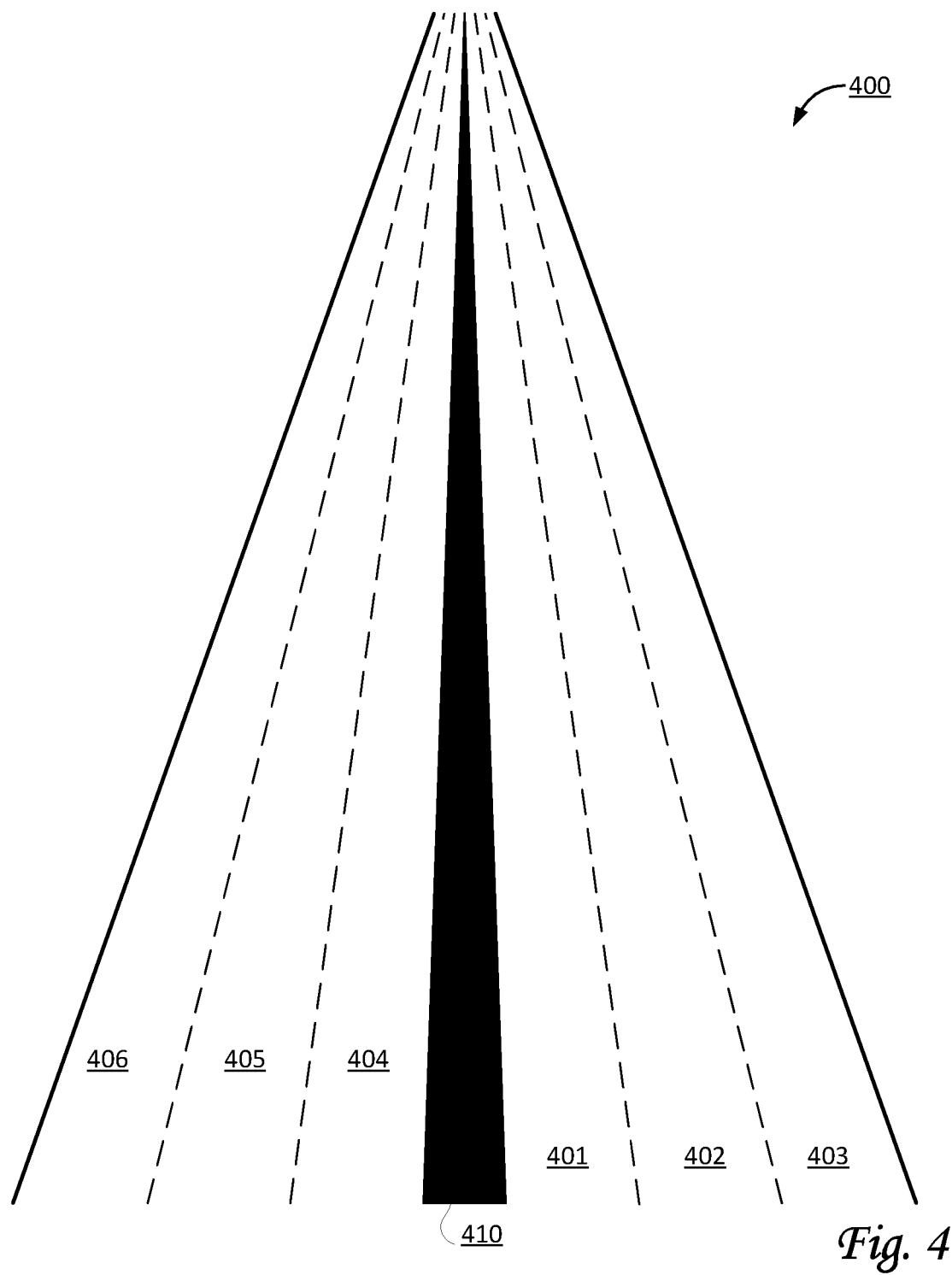

Information obtaining component 116 may be configured to obtain lane-specific information. In some implementations, lane-specific information may be obtained from remote computing server 129. For example, information obtaining component 116 may be configured to receive and/or determine lane-specific information regarding multiple traffic lanes in a particular roadway, such as the particular roadway at or near the current location of vehicle 12, e.g., as determined by location determination component 110. The multiple traffic lanes may include the current lane, e.g., as detected by lane detection component 114. The lane-specific information may be based on previously detected vehicle usage on the roadways, including the particular roadway. The previously detected vehicle usage on the roadways may include vehicle events of a set or fleet of vehicles. By way of non-limiting example, the lane-specific information may include information regarding previously detected fuel-efficiency, previously detected travel duration, previously detected average vehicle speed, previously detected average following distance, previously detected likelihood of vehicle events, previously detected operating complexity for the vehicle operator, and/or other previously detected vehicle usage. In some implementations, by way of non-limiting example, the lane-specific information may include information regarding estimated and/or expected fuel-efficiency, estimated and/or expected travel duration, estimated and/or expected average vehicle speed, estimated and/or expected average following distance, estimated and/ or expected likelihood of vehicle events, estimated and/or expected operating complexity for the vehicle operator, and/or other estimated and/or expected vehicle usage. For example, for a particular section of a particular roadway, perhaps more vehicles experience hard braking in the right lane than the left lane (e.g., due to the particular exits and/or on-ramps in the particular section of the particular roadway). For example, for a particular section of a particular roadway, perhaps the vehicle speed is smoother and/or more consistent in the right lane than the left lane (e.g., a lower average speed but more consistent and uniform speed may be advantageous for fuel efficiency and/or other vehicle operator goals). For example, for a particular section of a particular roadway, perhaps the following distance is greater and/or more consistent in the right lane than the left lane. For example, for a particular section of a particular roadway, perhaps the occurrences of fuel-inefficient maneuvers (such as, e.g., a rapid sequence of up-shifting and down-shifting) are more frequent in the right lane than the left lane. For example, for a particular section of a particular roadway, perhaps the occurrences of other vehicles merging into a lane are more frequent in the right lane than the left lane. In some implementations, the lane-specific information may be specific and/or particular to different types of vehicles (e.g., different detected vehicle usage for small trucks vs 18-wheelers). In some implementations, the lane-specific information may be specific and/or particular to different times of day (e.g., different detected vehicle usage at 8 a.m. versus 6 p.m.). In some implementations, the lane-specific information may be specific and/or particular to different levels or kinds of traffic (e.g., different detected vehicle usage in heavy traffic versus light traffic, or high number versus number level of detected pedestrians). As described herein, the use of left lanes and right lanes is merely exemplary, and not intended to be limiting in any way. By way of non-limiting example, FIG. 4 illustrates an exemplary roadway 400 as may be used by a system such as system 100 (depicted in FIG. 1). As depicted in FIG. 4, roadway 400 may include a left lane 401, a middle lane 402, and a right lane 403 heading in the same direction and divided by a divider 410 from three traffic lanes heading in the opposite direction, an inner traffic lane 404, a middle traffic lane 405, and an outer traffic lane 406.

Referring to FIG. 1, goal obtaining component 118 may be configured to obtain goals for providing lane-specific recommendations, advice, and/or preferences. In some implementations, goals may be obtained from remote computing server 129. In some implementations, goals may be obtained from a fleet manager of a fleet of multiple vehicles. In some implementations, goals may be obtained from the vehicle operator of vehicle 12. By way of non-limiting example, a particular goal for providing lane-specific recommendations to a particular vehicle may include one or more of fuel-efficiency, minimal travel duration, minimal likelihood of (certain types of) vehicle events, minimal operating complexity for the vehicle operator, and/or other goals. Combinations of different types of goals are envisioned within the scope of this disclosure. Rankings or orders of different types of goals are envisioned within the scope of this disclosure.

Recommendation component 120 may be configured to determine lane-specific recommendations, advice, and/or preferences for vehicles. For example, recommendation component 120 may be configured to determine a particular lane-specific recommendation to vehicle 12. In some implementations, determinations by recommendation component 120 may be based on the obtained lane-specific information and the obtained goal(s). In some implementations, determinations by recommendation component 120 may be unrelated to and/or independent of the current route or route guidance of vehicle 12. For example, a lane-specific recommendation may be unrelated to and/or independent of the current target destination of vehicle 12, as well as upcoming turns, exits, or lane-merges according to route guidance. Instead, the determinations by recommendation component 120 are based on other considerations, including but not limited to fuel-efficiency, minimal travel duration, minimal likelihood of (certain types of) vehicle events, and/or minimal operating complexity for the vehicle operator. As another example, a particular lane-specific recommendation may be not provided to limit the number of future lane changes, but rather to improve one or more of fuel-efficiency, expected trip duration, likelihood of occurrences of (certain types of) vehicle events, ease of vehicle operation (e.g., based on aptitude of a human or algorithmic vehicle operator)

In some implementations, determinations by recommendation component 120 may be based on a vehicle type of vehicle 12. In some implementations, determinations by recommendation component 120 may be based on current traffic conditions. In some implementations, determinations by recommendation component 120 may be based on a current time-of-day. For example, a particular lane-specific recommendation for vehicle 12 may indicate a preference for the left lane over the right lane for the next 10 miles. For example, a particular lane-specific recommendation for vehicle 12 may indicate a preference to avoid the right-most lane until further notice. For example, a particular lane-specific recommendation for vehicle 12 may be to stay in the middle lane (or, e.g., in one of the middle lanes) for the next 20 minutes. In some implementations, recommendation component 120 may take a likelihood of an occurrence of a vehicle event during a lane-change into consideration when determining recommendations. For example, if a preference for a particular lane is very slight, perhaps a change of traffic lanes would not be recommended and/or preferred.

Interface component 122 may be configured to provide the lane-specific recommendation to users, including but not limited to vehicle operators. In some implementations, lane-specific recommendations may be provided through a user interface in vehicle 12 such as, e.g., a display inside vehicle 12.

Distance determination component 124 may be configured to determine following distances for multiple traffic lanes of one or more roadways. For example, distance determination component 124 may be configured to determine a following distance for multiple traffic lanes of a particular roadway at the current location in the current direction of travel of vehicle 12. In some implementations, determinations of the lane-specific recommendations may be based on following distances determined by distance determination component 124. In some implementations, parameters derived from following distances may be used, including but not limited to aggregates, averages, consistency (e.g., uniformity), and so forth. By way of non-limiting example, referring to roadway 300 in FIG. 3, a system similar to system 100 may be configured to determine that the aggregate (e.g., average) following distance in left lane 301 is greater than the aggregate (e.g., average) following distance in right lane 302, and recommend one of the two traffic lanes as a result of that distinction (e.g., left lane 301, under the assumption that greater following distance may leave more time for braking than smaller following distance). Alternatively, and/or simultaneously, distance determination component 124 may be configured to determine that the consistency and/or uniformity of the aggregate following distance in left lane 301 is less or worse than for right lane 302, and reverse the recommendation for the two traffic lanes as a result of that distinction (e.g., recommend right lane 302, under the assumption that a consistent and/or uniform following distance is more beneficial for a particular goal than merely selecting the greater average following distance).

Speed determination component 126 may be configured to determine vehicle speeds for the multiple traffic lanes of one or more roadways. For example, speed determination component 126 may be configured to determine a particular vehicle speed for the multiple traffic lanes of the particular roadway at the current location in the current direction of travel of vehicle 12. In some implementations, determinations of the lane-specific recommendations may be based on the vehicle speeds determined by speed determination component 126. In some implementations, parameters derived from vehicle speeds may be used, including but not limited to aggregates, averages, consistency (e.g., uniformity), and so forth. By way of non-limiting example, referring to roadway 400 in FIG. 4, a system similar to system 100 may be configured to determine that the aggregate (e.g., average) vehicle speeds in left lane 401 and right lane 403 are greater than the aggregate (e.g., average) vehicle speed in middle lane 402, and recommend to avoid middle lane 402 as a result of that distinction (e.g., under the assumption that greater average vehicle speed may reduce total travel time). Alternatively, and/or simultaneously, speed determination component 126 may be configured to determine that the consistency and/or uniformity of the aggregate vehicle in middle lane 402 is better than for left lane 401 and right lane 403, and reverse the recommendation as a result of that distinction (e.g., recommend using middle lane 402, under the assumption that a consistent and/or uniform vehicle speed is more beneficial for a particular goal, such as fuel efficiency, than merely selecting the greater average vehicle speed).

In some implementations, server(s) 102, client computing platform(s) 104, and/or external resources 128 may be operatively linked via one or more electronic communication links. For example, such electronic communication links may be established, at least in part, via one or more network(s) 13 such as the Internet and/or other networks. It will be appreciated that this is not intended to be limiting, and that the scope of this disclosure includes implementations in which server(s) 102, client computing platform(s) 104, and/or external resources 128 may be operatively linked via some other communication media.

A given client computing platform 104 may include one or more processors configured to execute computer program components. The computer program components may be configured to enable an expert or user associated with the given client computing platform 104 to interface with system 100 and/or external resources 128, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 128 may include sources of information outside of system 100, external entities participating with system 100, and/or other resources. In some implementations, some or all of the functionality attributed herein to external resources 128 may be provided by resources included in system 100.

Remote computing server 129 may be separate, discrete, and/or distinct from individual vehicles (such as vehicle 12), and/or system 100. In some implementations, remote computing server 129 may be configured to receive, analyze, and/or otherwise process information from one of more vehicles, including but not limited to vehicle 12. In some implementations, remote computing server 129 may be configured to receive notifications from vehicle 12, e.g., regarding lane-specific recommendations.

Server(s) 102 may include electronic storage 130, one or more processors 132, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 130 may comprise non-transitory storage media that electronically stores information. The electronic storage media of electronic storage 130 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 130 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 130 may include one or more virtual storage resources (e.g., cloud storage, a virtual private network, and/or other virtual storage resources). Electronic storage 130 may store software algorithms, information determined by processor(s) 132, information received from server(s) 102, information received from client computing platform(s) 104, and/or other information that enables server(s) 102 to function as described herein.

Processor(s) 132 may be configured to provide information processing capabilities in server(s) 102. As such, processor(s) 132 may include one or more of a digital processor, an analog processor, a digital circuit designed to process information, an analog circuit designed to process information, a state machine, and/or other mechanisms for electronically processing information. Although processor(s) 132 is shown in FIG. 1 as a single entity, this is for illustrative purposes only. In some implementations, processor(s) 132 may include a plurality of processing units. These processing units may be physically located within the same device, or processor(s) 132 may represent processing functionality of a plurality of devices operating in coordination. Processor(s) 132 may be configured to execute components 110, 112, 114, 116, 118, 120, 122, 124, and/or 126, and/or other components. Processor(s) 132 may be configured to execute components 110, 112, 114, 116, 118, 120, 122, 124, and/or 126, and/or other components by software; hardware; firmware; some combination of software, hardware, and/or firmware; and/or other mechanisms for configuring processing capabilities on processor(s) 132. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 110, 112, 114, 116, 118, 120, 122, 124, and/or 126 are illustrated in FIG. 1 as being implemented within a single processing unit, in implementations in which processor(s) 132 includes multiple processing units, one or more of components 110, 112, 114, 116, 118, 120, 122, 124, and/or 126 may be implemented remotely from the other components. The description of the functionality provided by the different components 110, 112, 114, 116, 118, 120, 122, 124, and/or 126 described below is for illustrative purposes, and is not intended to be limiting, as any of components 110, 112, 114, 116, 118, 120, 122, 124, and/or 126 may provide more or less functionality than is described. For example, one or more of components 110, 112, 114, 116, 118, 120, 122, 124, and/or 126 may be eliminated, and some or all of its functionality may be provided by other ones of components 110, 112, 114, 116, 118, 120, 122, 124, and/or 126. As another example, processor(s) 132 may be configured to execute one or more additional components that may perform some or all of the functionality attributed below to one of components 110, 112, 114, 116, 118, 120, 122, 124, and/or 126.

Figure 2:
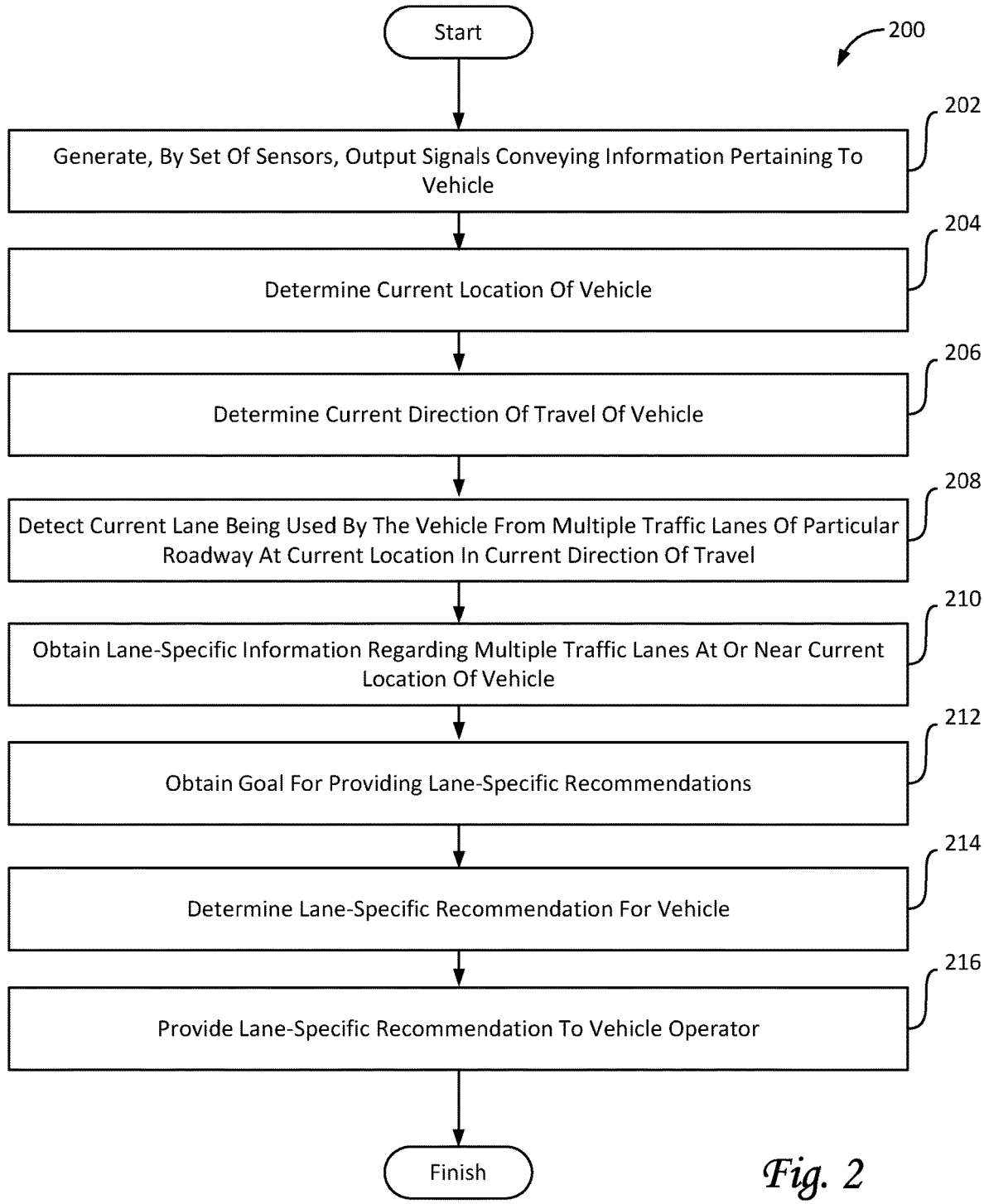
FIG. 2 illustrates a method for providing lane-specific recommendations to a vehicle operator of a vehicle, in accordance with one or more implementations.

FIG. 2 illustrates a method 200 for providing lane-specific recommendations to a vehicle operator of a vehicle operating on roadways, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating output signals conveying information pertaining to a particular vehicle. Operation 202 may be performed by one or more sensors that are the same as or similar to set of sensors 108, in accordance with one or more implementations.

An operation 204 may include determining a current location of the vehicle. The determination of the current location may be based on the generated output signals. The current location may correspond to a particular roadway. The particular roadway may include one or more lanes in each direction of travel. Operation 204 may be performed by one or more hardware processors configured by machine-readable instructions including a component that is the same as or similar to location determination component 110, in accordance with one or more implementations.

An operation 206 may include determining a current direction of travel of the vehicle. The determination of the current direction of travel may be based on the generated output signals. The current direction of travel may correspond to the particular roadway. The current direction of travel may be associated with multiple traffic lanes. Operation 206 may be performed by one or more hardware processors configured by machine-readable instructions including a component that is the same as or similar to direction determination component 112, in accordance with one or more implementations.

An operation 208 may include detecting a current lane being used by the vehicle from the multiple traffic lanes of the particular roadway at the current location in the current direction of travel. The detection of the current lane may be based on the generated output signals. Operation 208 may be performed by one or more hardware processors configured by machine-readable instructions including a component that is the same as or similar to lane detection component 114, in accordance with one or more implementations.

An operation 210 may include obtaining lane-specific information regarding the multiple traffic lanes at or near the current location of the vehicle. The multiple traffic lanes may include the current lane. The lane-specific information may be based on previously detected vehicle usage on the roadways. Operation 210 may be performed by one or more hardware processors configured by machine-readable instructions including a component that is the same as or similar to information obtaining component 116, in accordance with one or more implementations.

An operation 212 may include obtaining a goal for providing lane-specific recommendations. Operation 212 may be performed by one or more hardware processors configured by machine-readable instructions including a component that is the same as or similar to goal obtaining component 118, in accordance with one or more implementations.

An operation 214 may include determining a lane-specific recommendation for the vehicle. The determination of the lane-specific recommendation may be based on the obtained lane-specific information and the obtained goal. Operation 214 may be performed by one or more hardware processors configured by machine-readable instructions including a component that is the same as or similar to recommendation component 120, in accordance with one or more implementations.

An operation 216 may include providing the lane-specific recommendation to the vehicle operator. Operation 216 may be performed by one or more hardware processors configured by machine-readable instructions including a component that is the same as or similar to interface component 122, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for providing lane-specific recommendations to a vehicle operator of a vehicle operating on roadways based on a goal, wherein the roadways include one or more lanes in each direction of travel, the system comprising:
one or more hardware processors configured by machine-readable instructions to:
generate, by a set of sensors, output signals conveying information pertaining to the vehicle;
determine a current location of the vehicle, wherein the determination of the current location is based on the generated output signals, wherein the current location corresponds to a particular roadway, and wherein the particular roadway includes one or more lanes in each direction of travel;
determine a current direction of travel of the vehicle, wherein the determination of the current direction of travel is based on the generated output signals, wherein the current direction of travel corresponds to the particular roadway, and wherein the current direction of travel is associated with multiple traffic lanes;
detect a current lane being used by the vehicle from the multiple traffic lanes of the particular roadway at the current location in the current direction of travel, wherein the detection of the current lane is based on the generated output signals;
obtain lane-specific information regarding the multiple traffic lanes at or near the current location of the vehicle, wherein the multiple traffic lanes include the current lane, wherein the lane-specific information is based on previously detected vehicle usage on the roadways;
obtain one or more goals for the lane-specific recommendations from a fleet manager of a fleet of multiple vehicles, wherein the vehicle is included in the fleet of multiple vehicles, wherein the one or more goals pertain to operating complexity for the vehicle operator among the multiple traffic lanes;
determine a lane-specific recommendation for the vehicle regarding the multiple traffic lanes, wherein the determination of the lane-specific recommendation is based on the obtained lane-specific information and the one or more goals; and
provide the lane-specific recommendation to the vehicle operator, wherein execution of the lane-specific recommendation results in progress toward the one or more goals.

2. The system of claim 1, wherein the determination of the lane-specific recommendation is further based on a vehicle type of the vehicle.

3. The system of claim 1, wherein the determination of the lane-specific recommendation is further based on current traffic conditions.

4. The system of claim 1, wherein the determination of the lane-specific recommendation is further based on a current time-of-day.

5. The system of claim 1, wherein the vehicle operator is an autonomous driving algorithm.

6. The system of claim 1, wherein the one or more hardware processors are further configured by machine-readable instructions to:
determine following distances for the multiple traffic lanes of the particular roadway at the current location in the current direction of travel, wherein the determination of the lane-specific recommendation is further based on the following distances.

7. The system of claim 1, wherein the one or more hardware processors are further configured by machine-readable instructions to:
determine vehicle speeds for the multiple traffic lanes of the particular roadway at the current location in the current direction of travel, wherein the determination of the lane-specific recommendation is further based on the vehicle speeds.

8. The system of claim 1, wherein the current location is located along a current route of the vehicle to a current target destination, and wherein the lane-specific recommendation is independent of the current route and the current target destination.

9. The system of claim 1, wherein the lane-specific recommendation is determined based on the one or more goals pertaining to lowering the operating complexity for the vehicle operator, wherein the operating complexity in a particular lane of the particular roadway is higher than in a different lane of the particular roadway due to particular exits and/or on-ramps in the particular section of the particular roadway.

10. The system of claim 1, wherein the one or more goals for the lane-specific recommendations include a combination of one or more of fuel-efficiency, minimal travel duration, and/or minimal likelihood of vehicle events, with the operating complexity for the vehicle operator.

11. A method for providing lane-specific recommendations to a vehicle operator of a vehicle operating on roadways based on a goal, wherein the roadways include one or more lanes in each direction of travel, the method comprising:
generating, by a set of sensors, output signals conveying information pertaining to the vehicle;
determining a current location of the vehicle, wherein the determination of the current location is based on the generated output signals, wherein the current location corresponds to a particular roadway, and wherein the particular roadway includes one or more lanes in each direction of travel;
determining a current direction of travel of the vehicle, wherein the determination of the current direction of travel is based on the generated output signals, wherein the current direction of travel corresponds to the particular roadway, and wherein the current direction of travel is associated with multiple traffic lanes;
detecting a current lane being used by the vehicle from the multiple traffic lanes of the particular roadway at the current location in the current direction of travel, wherein the detection of the current lane is based on the generated output signals;
obtaining lane-specific information regarding the multiple traffic lanes at or near the current location of the vehicle, wherein the multiple traffic lanes include the current lane, wherein the lane-specific information is based on previously detected vehicle usage on the roadways;
obtaining one or more goals for the lane-specific recommendations from a fleet manager of a fleet of multiple vehicles, wherein the vehicle is included in the fleet of multiple vehicles, wherein the one or more goals pertain to operating complexity for the vehicle operator among the multiple traffic lanes;

determining a lane-specific recommendation for the vehicle regarding the multiple traffic lanes, wherein the determination of the lane-specific recommendation is based on the obtained lane-specific information and the one or more goals; and providing the lane-specific recommendation to the vehicle operator, wherein execution of the lane-specific recommendation results in progress toward the one or more goals.

12. The method of claim 11, wherein the determination of the lane-specific recommendation is further based on a vehicle type of the vehicle.

13. The method of claim 11, wherein the determination of the lane-specific recommendation is further based on current traffic conditions.

14. The method of claim 11, wherein the determination of the lane-specific recommendation is further based on a current time-of-day.

15. The method of claim 11, wherein the vehicle operator is an autonomous driving algorithm.

16. The method of claim 11, further comprising:

determining following distances for the multiple traffic lanes of the particular roadway at the current location in the current direction of travel, wherein the determination of the lane-specific recommendation is further based on the following distances.

17. The method of claim 11, further comprising:

determining vehicle speeds for the multiple traffic lanes of the particular roadway at the current location in the current direction of travel, wherein the determination of the lane-specific recommendation is further based on the vehicle speeds.

18. The method of claim 11, wherein the current location is located along a current route of the vehicle to a current target destination, and wherein the lane-specific recommendation is independent of the current route and the current target destination.

19. The method of claim 11, wherein the lane-specific recommendation is determined based on the one or more goals pertaining to lowering the operating complexity for the vehicle operator, wherein the operating complexity in a particular lane of the particular roadway is higher than in a different lane of the particular roadway due to particular exits and/or on-ramps in the particular section of the particular roadway.

20. The method of claim 11, wherein the one or more goals for the lane-specific recommendations include a combination of one or more of fuel-efficiency, minimal travel duration, and/or minimal likelihood of vehicle events, with the operating complexity for the vehicle operator.

* * * * *